M. LLOBET.
SELF ACTING WATER BALANCE.
APPLICATION FILED APR. 20, 1911.
1,030,099.
Patented June 18, 1912.
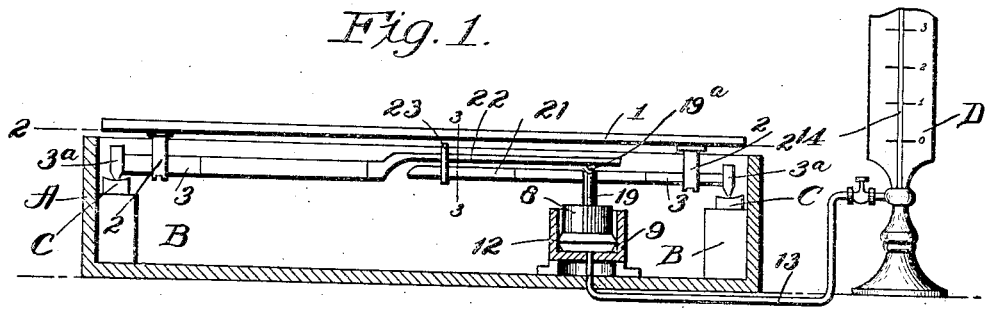
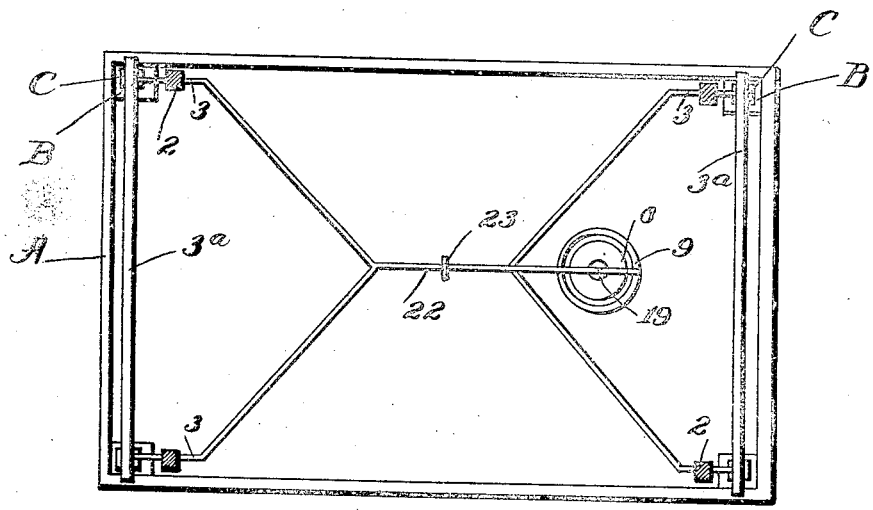
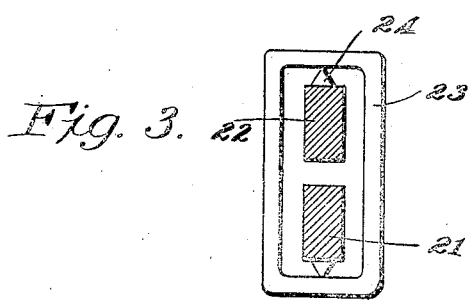
Inventor
Miguel Llobet,

UNITED STATES PATENT OFFICE.

MIGUEL LLOBET, OF BARCELONA, SPAIN.

SELF-ACTING WATER-BALANCE.

1,030,099.  Specification of Letters Patent.  Patented June 18, 1912.

Application filed April 20, 1911. Serial No. 622,330.

*To all whom it may concern:*

Be it known that I, MIGUEL LLOBET, a subject of the King of Spain, residing at Barcelona, Spain, have invented certain new and useful Improvements in Self-Acting Water-Balances; and I do hereby declare the following to be a full, clear, and exact description of the invention, such as will enable others skilled in the art to which it appertains to make and use the same.

My invention relates to improvements in self-acting water balances in which the weight exerts a pressure upon the liquid contained in a vessel and causes said liquid to flow into a tube which communicates with a manometer or with a vertical tube wherein the liquid rises until the equilibrium level is reached, when the weight of the body may be read on a graduated scale.

The invention consists in arranging the cylinder and the piston loosely fitted into one another and in locating therebetween an elastic vessel, filled in with liquid, in communication with the vertical column which marks the weight on a graduated scale.

The invention further consists in certain combinations of levers to transmit to the liquid the pressure exercised by the body to be weighed.

With these and other objects in view the invention consists in the novel details of construction and combinations of parts more fully hereinafter disclosed and particularly pointed out in the claims.

Referring to the accompanying drawings forming a part of this specification in which like numerals designate like parts in all the views:—Figure 1 is a longitudinal view partly in elevation and partly in section of the apparatus complete; Fig. 2 is a top plan view of Fig. 1 with the platform removed, and taken on the line 2—2 thereof; and Fig. 3 is a detail transverse sectional view taken on the line 3—3 of Fig. 1.

Referring to the apparatus in detail, A designates a suitable casing provided at either end thereof with supports B for mounting the scale platform or plate 1. Said plate is provided on the underside and at either end with forks 2, engaging with the arms 3 of the levers 21 and 22. Each of said levers has the arms 3 thereof connected by a bar $3^a$, which is mounted on blocks C, and by means of which said levers are fulcrumed. The levers 21 and 22 engage with a ring 23, which surrounds said levers as illustrated in Fig. 3. At the points of engaging with said ring, the levers are each provided with a spur 24, that contact with said ring at opposite ends, and which, by reason of their small bearing surfaces, have relatively little friction with said ring.

A cylinder 9 open at one end is mounted on the base of the casing A, and has loosely working therein a piston 8 provided with a piston rod 19, that is adapted to be engaged by a member $19^a$ carried by the lever 22 adjacent the free end thereof. Within the cylinder 9 is located a vessel 12 having elastic and water tight walls, and which communicates with the column 14 of a manometer D through the medium of a tube 13. It is to be understood, of course, that the collapsible vessel 12 is designed to contain a liquid which through the weight of the platform 1 is caused to move in the graduated column 14 of the manometer.

It is obvious that those skilled in the art may vary the details of construction and arrangement of parts without departing from the spirit of my invention, and therefore I do not wish to be limited to such features except as may be required by the claims.

I claim—

1. In an automatic water balance, the combination of a cylinder, a piston mounted in the cylinder, a collapsible vessel filled with a liquid and arranged in the cylinder, a manometer connected to the collapsible vessel, a rod projecting from the piston, a pair of levers pivotally supported at one of their ends, one of the levers being pivotally supported on said rod, a ring connecting the other lever to the first lever, and a platform carried by the levers for sustaining a weight, substantially as described.

2. In an automatic water balance, the combination of a cylinder, a collapsible vessel filled with a liquid and arranged in the cylinder, a manometer connected to the collapsible vessel, a pair of levers pivotally supported at one of their ends, one of the levers being pivotally supported at its other end by the piston and the other lever being pivotally suspended from the first mentioned lever, and a platform carried by the levers for sustaining a weight, substantially as described.

In testimony whereof, I affix my signature, in presence of two witnesses.

MIG. LLOBET.

Witnesses:
 CONSTANTINE LUPEZ Y CID,
 JAIME CASTELLO.